United States Patent [19]
Ris

[11] Patent Number: 5,152,576
[45] Date of Patent: Oct. 6, 1992

[54] ADJUSTABLE WINDSHIELD SUPPORT

[75] Inventor: John P. Ris, Troy, Mich.

[73] Assignee: General Motors Corporation, Detroit, Mich.

[21] Appl. No.: 803,169

[22] Filed: Dec. 9, 1991

[51] Int. Cl.⁵ .............................................. B60J 1/04
[52] U.S. Cl. ................................. 296/201; 296/96.21; 269/231; 52/208; 52/766; 52/768
[58] Field of Search ............ 296/201, 84.1, 90, 96.21; 29/281.4, 281.5, 468; 52/208, 217, 766, 767, 768; 24/324, 590, 662; 269/231, 235, 305

[56] References Cited

U.S. PATENT DOCUMENTS 4,659,138  4/1987  Gösse et al. .................... 296/201
4,779,919  10/1988  Muller ............................ 296/201

Primary Examiner—Margaret A. Focarino
Assistant Examiner—Andrew C. Pike
Attorney, Agent, or Firm—Charles E. Leahy

[57] ABSTRACT

A two-piece adjustable support for supporting the edge of a windshield panel on a vehicle body includes a molded plastic base member and molded plastic rotary cam member. The base member and the rotary cam member have integrally molded mating cylindrical elements with a snap-fitting retention mechanism to rotatably mount the rotary cam member on the base member. The base member has an integrally molded fastener which inserts through an aperture in the vehicle body panel to immovably mount the base member on the vehicle body. The rotary cam member has a cam surface on the periphery thereof for engaging and supporting the lower edge of the windshield panel. A detent integrally molded with the members includes a plurality of teeth molded on the rotary cam member and engaged by at least one tooth carried by a flexible spring arm integrally molded with the base member.

5 Claims, 2 Drawing Sheets

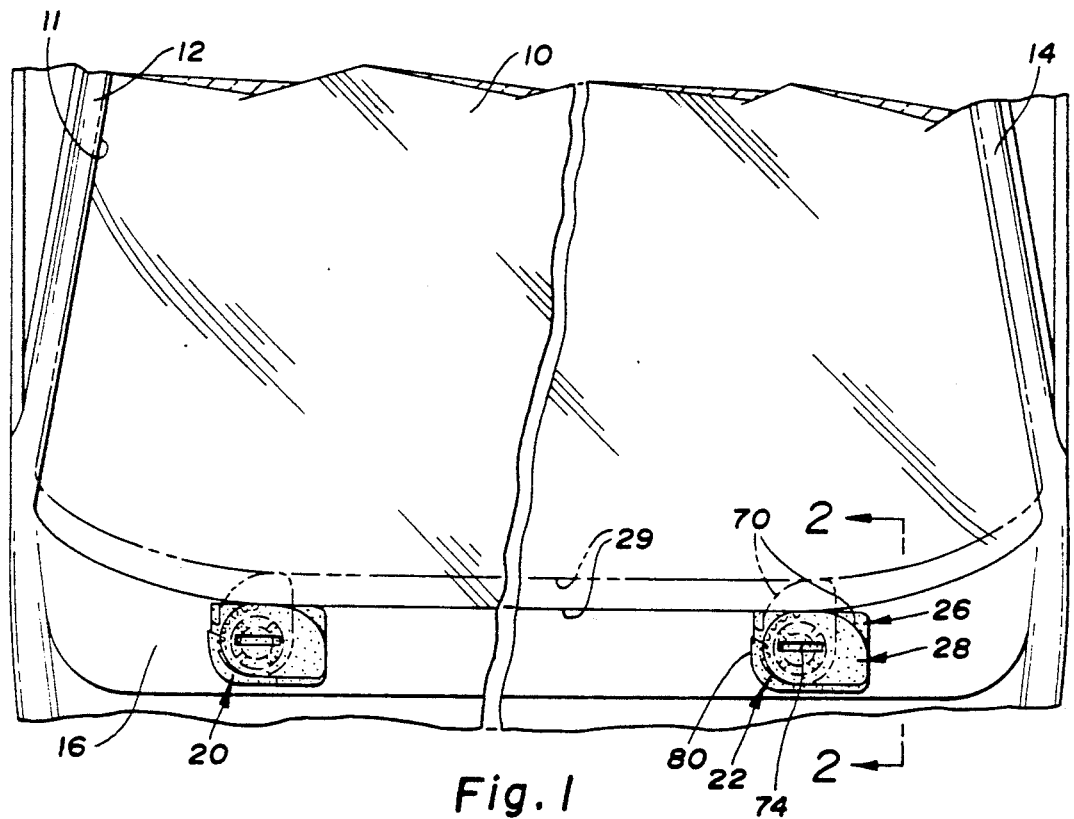
Fig. 1
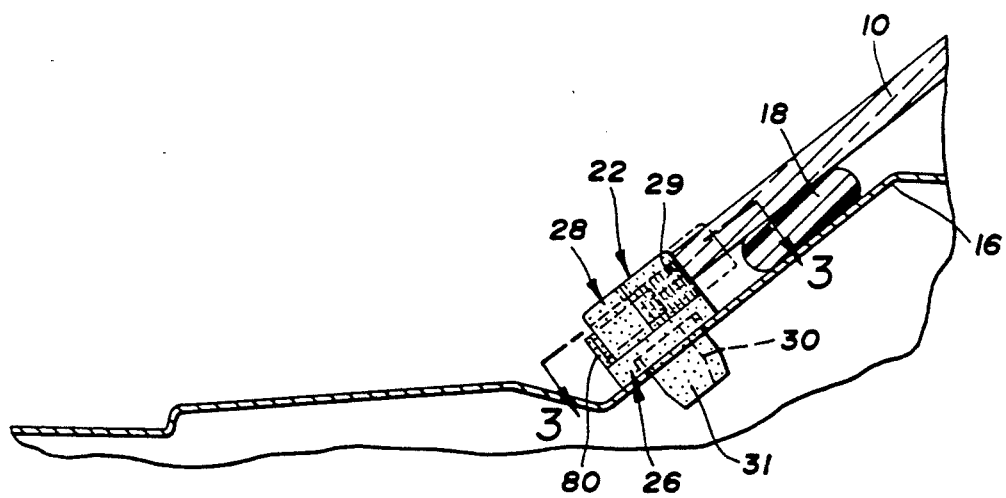
Fig. 2
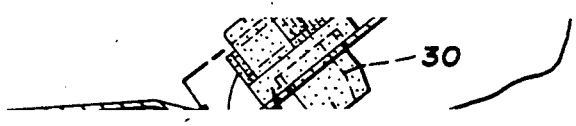

ADJUSTABLE WINDSHIELD SUPPORT

The invention relates to the mounting of a windshield panel on a vehicle body, and more particularly provides an adjustable support for supporting the lower edge of the windshield panel.

BACKGROUND OF THE INVENTION

It is well known to mount a window or windshield panel within a windshield opening of a vehicle body by applying a bead of adhesive which acts between the inner face of the windshield panel and a flange of the vehicle body. As the adhesive is curing, the weight of the windshield panel may cause the windshield panel to slide downwardly. Therefore it is necessary to support the weight of the windshield panel while the adhesive cures.

The prior art has proposed adjustable supports mounted on the vehicle body at the lower edge of the windshield opening for engaging the edge of the windshield panel to support the weight of the windshield panel.

It would be desirable to provide an adjustable support comprised of only two parts and capable of mounting on the vehicle without independent fasteners, to thereby economize the manufacture and assembly of the adjustable support.

SUMMARY OF THE INVENTION

A two-piece adjustable support for supporting the edge of a windshield panel on a vehicle body includes a molded plastic base member and molded plastic rotary cam member. The base member and the rotary cam member have integrally molded mating cylindrical elements with snap-fitting retention means to rotatably mount the rotary cam member on the base member. The base member has an integrally molded fastener which inserts through an aperture in the vehicle body panel to immovably mount the base member on the vehicle body. The rotary cam member has a cam surface on the periphery thereof for engaging and supporting the lower edge of the windshield panel. A detent integrally molded with the members includes a plurality of teeth molded on the rotary cam member and engaged by at least one tooth carried by a flexible spring arm integrally molded with the base member.

The object, feature, and advantage of the invention resides in the provision of a two-piece molded plastic adjustable support for supporting the weight of the windshield panel within a vehicle body opening.

A further object, feature, and advantage of the invention resides in the provision of a two-piece adjustable support which is assembled together without independent fasteners and is assembled to the vehicle body without independent fasteners.

DESCRIPTION OF THE DRAWINGS

These and other objects, features, and advantages of the invention will become apparent upon consideration of the description of the preferred embodiment, and the appended drawings in which FIG. 1 is plan view of a vehicle body showing the adjustable supports supporting the lower edge of the window panel;

FIG. 2 is a sectional view taken in the direction of arrows 2—2 of FIG. 1;

DESCRIPTION OF THE PREFERRED EMBODIMENT

Figure 3:
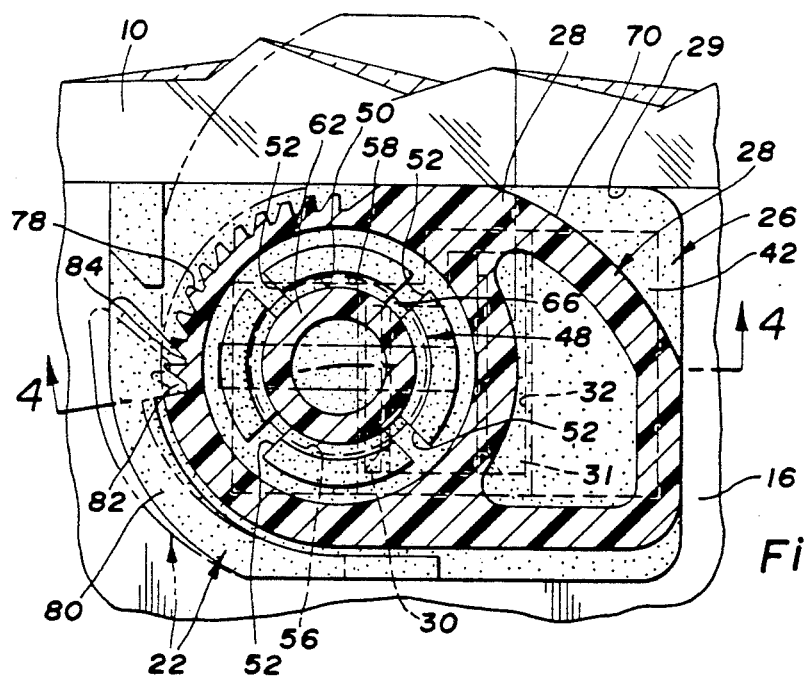
FIG. 3 is a sectional view taken in the direction of arrows 3—3 of FIG. 2.

Referring to FIGS. 1 and 2, it is seen that a windshield or window panel 10 is mounted within a vehicle body opening 11 defined by pillars 12 and 14 and a cowl panel 16. The windshield panel 10 is secured to the vehicle body by a bead of curable adhesive 18. The adhesive 18 may be applied to either the vehicle body or to the windshield panel and the windshield panel is then positioned within the vehicle body opening. In order to support the weight of the windshield panel 10 while the curable adhesive 18 cures, a pair of identical adjustable supports 20 and 22 are provided. The adjustable support 22 is comprised of a base member 26 which is immovably mounted on the cowl panel 16 and a rotary cam member 28 which is rotatably mounted on the base member 26 and may be rotated into adjustment with the lower edge 29 of the windshield panel 10.

Figure 4:
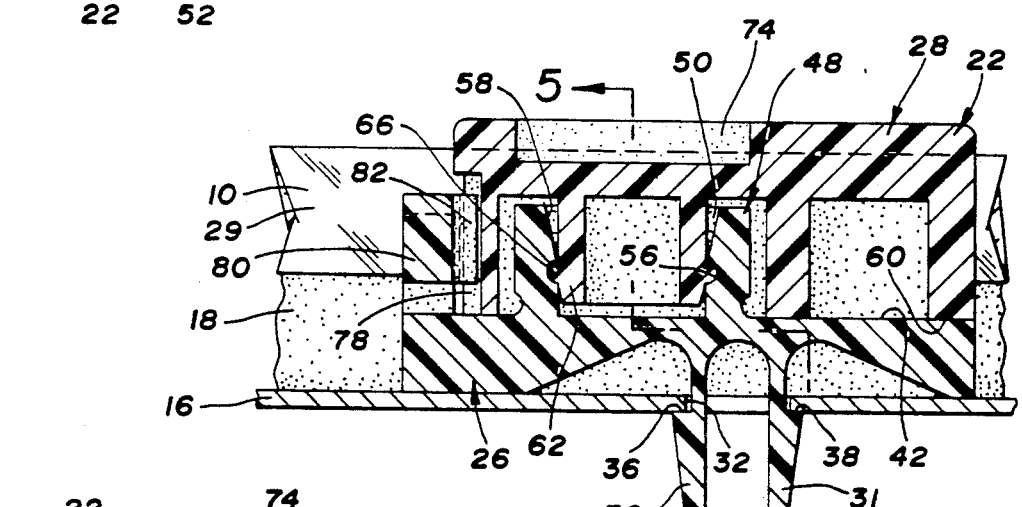
FIG. 4 is a sectional view taken in the direction of arrows 4—4 of FIG. 3.
Figure 5:
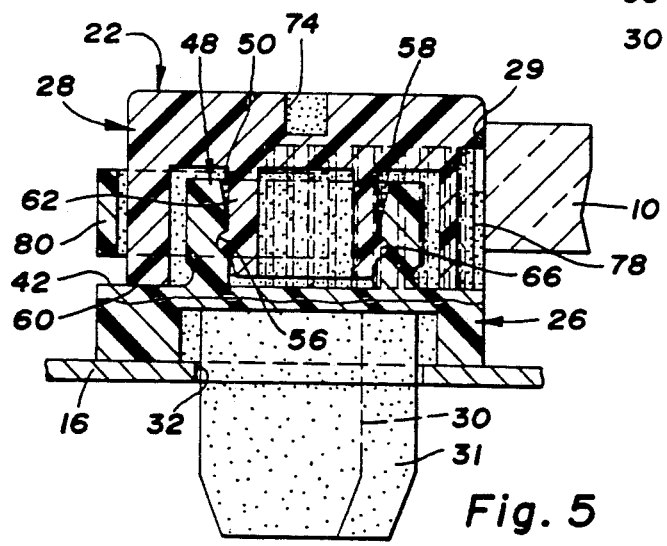
FIG. 5 is a sectional view taken in the direction of arrows 5—5 of FIG. 4.

As best seen in FIGS. 4 and 5, base member 26 is of molded plastic construction and is immovably attached to the cowl panel 16 by snap fingers 30 and 31 which extend through a rectangular-shaped aperture 32 so that the base member 26 cannot rotate relative to the cowl panel 16. The legs 30 and 31 respectively have shoulders 36 and 38 which engage with the underside of the cowl panel 16 prevent removal of the base member 26 from the cowl panel 16.

The base member also has an upper planar surface 42 from which a circular cylindrical wall 48 projects to define a female receptacle 50. As best seen in FIGS. 3 and 4 this cylindrical wall 48 has a plurality of cutouts 52 around the circumference thereof to enable limited yielding movement of the cylindrical wall 48. In addition, the cylindrical wall 48 has a circumferential extending groove 56 and a tapered entry chamfer 58 which will be discussed further hereinafter.

The rotary cam member 28 has a lower planar face 60 which rests upon the upper planar face 42 of the base member 26. The rotary cam member 28 is rotatably mounted on the base member 26 by a circular cylindrical wall 62 which projects from the rotary base member 28 into the female receptacle 50 defined by the cylindrical wall 48 of the base member 26. As is best seen in FIGS. 4 and 5, the cylindrical wall 62 carries a rib 66 around the outer periphery thereof. Upon mounting of the rotary cam member 28 onto the base member 26, the rib 66 slides along the tapered entry chamfer 58 of the cylindrical wall 48 and then snaps into the recess 56 to rotatably mount and retain the rotary cam member 28 on the base member 26.

As best seen in FIGS. 1 and 3, the rotary cam member 28 carries a cam surface 70 which engages the lower edge 29 of the windshield panel 10. The rotary cam member has a screwdriver slot 74 by which the rotary cam member 28 can be rotated in the counterclockwise direction as viewed in FIG. 3 to thereby carry the point of engagement of the cam surface 70 with the lower edge 29 of the windshield panel 10 to a progressively higher and higher elevation. Rotary adjustment of the rotary cam member supports the windshield panel 10 at a range of positions between the lowest position shown in solid line in FIG. 1 and a highest position shown in phantom line in FIG. 1.

The rotary cam member 28 is held at a desired rotary position by a detent mechanism which includes ratchet teeth 78 molded on the rotary cam member 28 in an arc about the rotary axis of the rotary cam member. The base member 26 carries a flexible spring arm 80 which is integrally molded therewith and which carries a pair of teeth 82 and 84 on the end thereof which engage with the ratchet teeth 78 of the rotary cam member 28. Accordingly, as seen in FIG. 3, the progressive rotation of the rotary cam member 28 in the counterclockwise direction will cause the teeth 82 and 84 of the flexible spring arm to ratchet over the teeth 78 and then retain the rotary position at its furthest extent of rotation.

Thus it is seen that the invention provides a new and improved two-piece, plastic, snap-together, adjustable support for a windshield. FIGS. 1 through 5 show a preferred embodiment of the invention and many changes and modifications can be made within the scope of the appended claims. A molding, not shown, is preferably attached to the body to overlie and conceal the bottom edge of the windshield panel and the adjustable supports 20 and 22.

The embodiments of the invention in which an exclusive property or privilege is claimed are defined as follows:

1. An adjustable support for supporting an edge of a window panel mounted on a vehicle body, comprising:
   a base member of molded plastic construction immovably mounted on the vehicle body,
   a rotary cam member of molded plastic construction having a cam surface so that rotary movement of the cam member about an axis of rotation adjusts the cam surface to engage and support the window panel,
   rotary pivot means mounting the rotary cam member on the base member and having mating cylindrical elements respectively provided on the members and of integrally molded one-piece construction therewith to define the axis of rotation of the rotary cam member, and
   ratchet detent means acting between the members and of integrally molded one-piece construction therewith to retain the rotary cam member at a selected rotary position relative to the base member.

2. The adjustable support of claim 1 further characterized by said ratchet detent means including a plurality of teeth integrally molded on one member of the members and a flexible arm of integrally molded one-piece construction with another member of the members and carrying at least one tooth engaging at least one of the plurality of teeth of the one member.

3. An adjustable support for supporting an edge of a window panel mounted on a vehicle body, comprising:
   a base member of molded plastic construction immovably mounted on the vehicle body and having a first cylindrical rotary portion surrounded by a first planar support face,
   a rotary cam member of molded plastic construction having a cam surface on a periphery thereof and a second cylindrical rotary portion surrounded by a second planar support face,
   first and second mating retention means molded respectively in integral one-piece construction with the base member and the rotary cam member and effective upon mating of the first and second cylindrical rotary portions to rotatably mount the rotary member on the base member with the first planar support surface resting upon the second planar support surface so that rotary movement of the cam member about an axis of rotation adjusts the cam surface to engage and support the window panel, and
   ratchet detent means acting between the members and of integrally molded one-piece construction therewith to retain the rotary cam member at a selected rotary position relative to the base member.

4. The adjustable support of claim 3 further characterized by said ratchet detent means including a plurality of teeth integrally molded on one member of the members and a flexible arm of integrally molded one-piece construction with another member of the members and carrying at least one tooth engaging one of the plurality of teeth of the one member.

5. An adjustable support for supporting an edge of a window panel mounted on an apertured panel of a vehicle body, comprising:
   a base member of molded plastic construction and having integrally molded fastener means engaging with an aperture of the apertured vehicle body panel to attach the base member on the vehicle body,
   a rotary cam member of molded plastic construction having a cam surface adapted to engage and support the window panel,
   pivot means mounting the rotary cam member on the base member and having mating cylindrical elements respectively provided on the members and of integrally molded one-piece construction therewith to define an axis of rotation of the rotary cam member relative to the base member so that rotary movement of the cam member about the axis of rotation adjusts the cam surface to engage and support the window panel,
   and ratchet detent means acting between the members to retain the rotary cam member at a selected rotary position relative to the base member, said ratchet detent means including a plurality of teeth of integrally molded one-piece construction carried by the rotary cam member and engaged by at least one tooth carried by a flexible spring arm integrally molded with the base member.

* * * * *